No. 896,035. PATENTED AUG. 11, 1908.
S. H. MITCHELL.
HEN'S NEST.
APPLICATION FILED JULY 22, 1907.
2 SHEETS—SHEET 1.
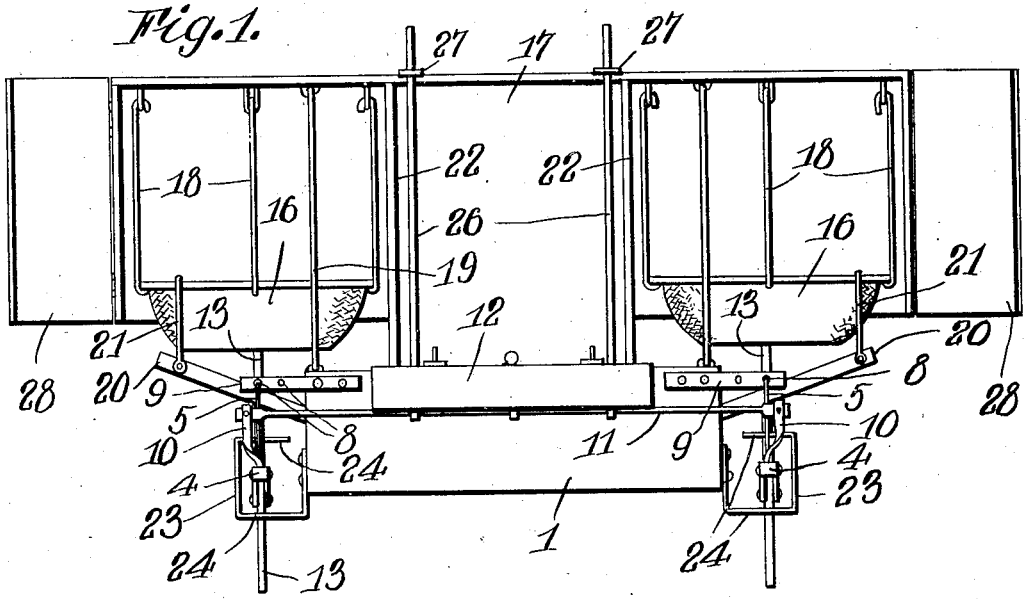
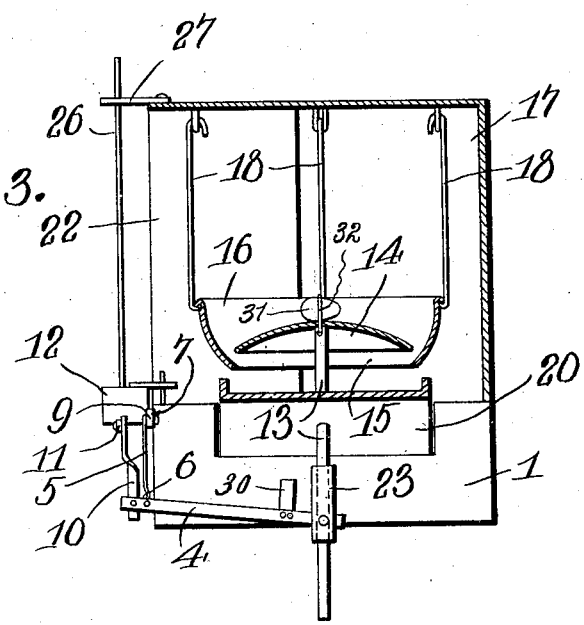
Witnesses
Arthur Wesley
C. H. Griesbauer
Inventor
Sidney H. Mitchell.
H. B. Willson & Co
By
Attorneys No. 896,035. PATENTED AUG. 11, 1908.
S. H. MITCHELL.
HEN'S NEST.
APPLICATION FILED JULY 22, 1907.
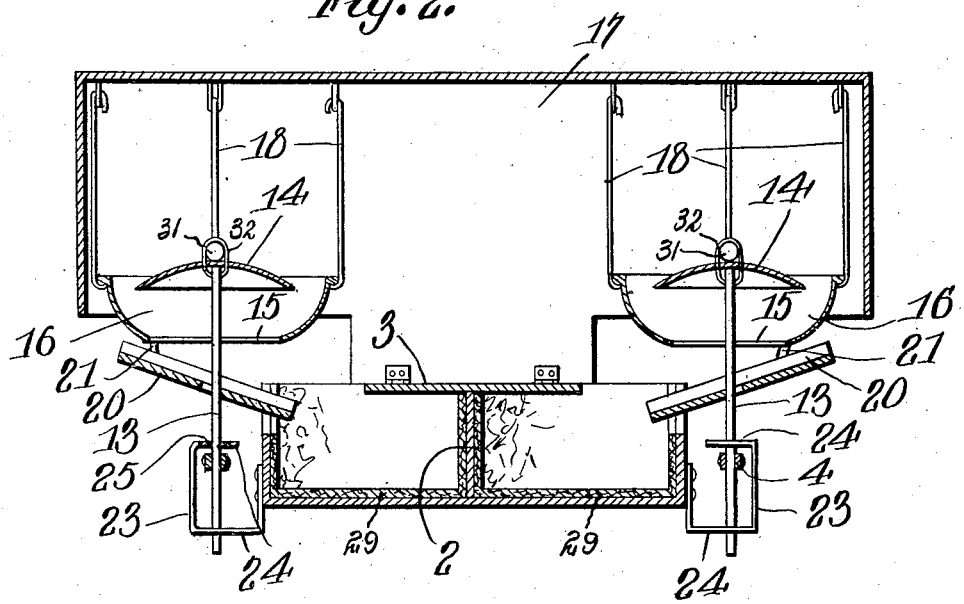
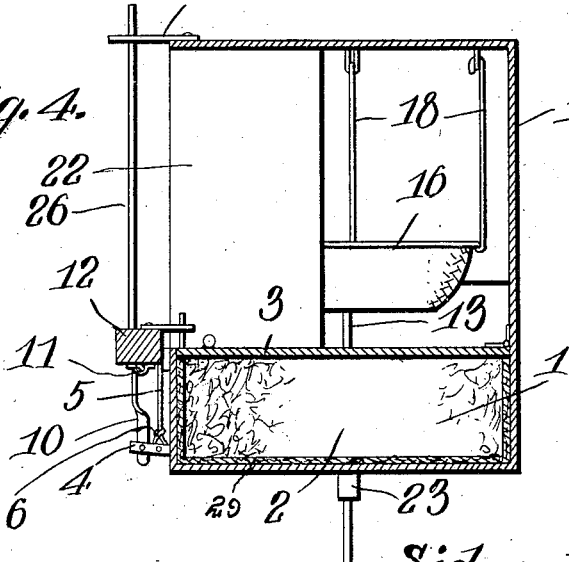
Sidney H. Mitchell, Inventor
Witnesses
Arthur Wesley
C. H. Griesbauer
By H. B. Willson & Co.
Attorneys

UNITED STATES PATENT OFFICE.

SIDNEY H. MITCHELL, OF SHEFFIELD, VERMONT.

HEN'S NEST.

No. 896,035.   Specification of Letters Patent.   Patented Aug. 11, 1908.

Application filed July 22, 1907. Serial No. 384,971.

*To all whom it may concern:*

Be it known that I, SIDNEY H. MITCHELL, a citizen of the United States, residing at Sheffield, in the county of Caledonia and State of Vermont, have invented certain new and useful Improvements in Hen's Nests; and I do declare the following to be a full, clear, and exact description of the invention, such as will enable others skilled in the art to which it appertains to make and use the same.

This invention has relation to new and useful improvements in double compartment hen's nests and has for its object to provide a nest with means whereby the eggs are automatically collected or received by a receptacle or egg box arranged under the nest out of reach of the hen to prevent the eggs from being eaten or damaged by the hen as is now the case in many instances.

With the foregoing and other objects in view which will appear as the nature of the invention is better understood, the invention consists in certain novel features of construction, combination and arrangement of parts as will be more particularly described and claimed.

In the accompanying drawings, Figure 1 is a side elevation of the hen's nest constructed in accordance with the invention, the doors of the housing open to more advantageously illustrate its construction; Fig. 2 is a longitudinal section of the hen's nest taken slightly in front of the vertically movable spindles or plungers; Fig. 3 is a cross section taken through one end of the housing and slightly in front of the adjacent spindle or plunger and guide member. Fig. 4 is a cross sectional view of the nest taken a little to one side of the center of the egg receptacle.

As shown in the drawings and in accordance with the invention, 1 indicates a suitable box or receptacle for receiving the eggs from the nest, said box or receptacle being divided into two compartments by a central transverse partition 2 and having a central opening in its top adapted to be closed by a door or cover 3.

Transversely disposed levers 4 are arranged at the ends of the egg receptacle or box and are pivotally connected thereto near their front ends by hangers 5, bent and twisted centrally to form loops 6 to facilitate their attachment to the levers and having hooks 7 at their ends adapted to engage in two longitudinal alining apertures or openings 8 in the outer ends of two longitudinally disposed supporting plates 9 screwed or otherwise fastened to the side of the egg receptacle or box near its upper corners. The extreme front ends of said levers are loosely connected to the lower ends of two vertically disposed arms 10 connected at their upper or opposite ends to the ends of a longitudinally disposed supporting rod or bar 11 carrying a central longitudinally disposed tread-block or member 12, the purpose of which will be disclosed. The inner ends of said transversely disposed levers 4 are connected in any suitable manner intermediately of the ends of vertically disposed spindles or plungers 13 provided at their upper ends with suitable caps or heads 14 having outer convex surfaces adapted to normally close the central openings 15 in the bottom of the nests proper 16 sustained in removable position to a suitable housing or casing 17 mounted on and arranged longitudinally of the egg receptacle by suspension rods 18 connected at their lower ends to the nests and at their upper or opposite ends to the top of the housing.

The casing or housing is preferably connected with the egg receptacle by connecting rods 19 preferably connected at their lower ends to the side pieces of the egg receptacle and at their opposite ends with the top of the housing. This housing may be connected with the box in any suitable manner as it does not constitute part of the invention. Suitable chutes 20 are arranged immediately under the nests proper and are connected by rods 21 or other equivalent means at their outer ends thereto causing them to normally assume an inclined position with reference to the egg receptacle. The inner ends of these chutes communicate with the ends of the egg receptacle, portions of the ends thereof being removed to receive the inner ends of the chutes.

Suitable partitions 22 are arranged between the top of the egg receptacle and housing slight distances laterally of the side edges of the cover or door of said receptacle to form an entrance for the hen. Vertically disposed guides 23 formed from single pieces of metal bent to form upper and lower horizontal portions 24 having vertically alined apertures or openings 25 to receive the vertically movable spindles or plungers 13 are arranged at the ends of the box to guide said spindles or plungers. Vertically movable guide rods 26 are arranged one near each end of the tread-block or member 12 and work through the outer or free ends of guide-plates 27 pivotally connected at their inner or opposite ends to the top of the housing. Doors 28 are arranged at the front of the housing and close in the front of the same preferably between the ends of the housing and the partitions 22.

In practice, the hen enters the nest through the entrance formed by the partitions 22 and discovers one of the nests proper. As the hen passes out of the nest and steps on the tread-block or member 12, the vertically movable spindles or plungers are caused to move upwardly and disclose the openings in the lower end of the nest proper and any eggs that may be in either of the nests roll on the chute and into the egg receptacle which is preferably lined with strips 29 of felt or other suitable material to prevent them from breaking or becoming otherwise damaged.

Vertical blocks or members 30 at the inner ends of the transversely disposed levers engage under the chutes 20 and raise them in a substantially horizontal position with reference to the egg receptacle when the tread block or member 12 is depressed and as soon as the hen steps from the tread-block, the vertically movable spindles drop into their normal positions and the caps or heads 14 at the upper ends thereof close the openings in the bottoms of the nest proper.

Nest eggs 31 are fastened to the upper convex surfaces of the caps or heads 14 in any suitable manner to render the appearance of the nest as natural as possible.

The guide plates 27 are pivotally connected to the top of the housing so as to permit of a slight lateral movement of the upper ends of the guide rods 26 to enable either of the nests proper to be opened or closed independently of the other.

In the drawings, I have shown a fastening means for the nest eggs which consists in passing wires 32 through the ends of the vertically movable spindles, thence up through the caps or heads 14 and thence around the nest eggs to which they are fastened by screws or other equivalent means.

From the foregoing description, taken in connection with the accompanying drawings, the construction and operation of the invention will be readily understood without requiring a more extended explanation.

Having thus described my invention, what I claim as new is:—

1. In a hen's nest, the combination with an egg receptacle having suitable openings in its ends, of nests proper having openings in their bottoms sustained above and at the ends of the egg receptacle, chutes arranged under the nests and communicating with the openings in the ends of the egg receptacle and nest closing means carried by said receptacle for normally closing the openings in said nests and adapted to be operated by the weight of a hen for disclosing said openings.

2. The combination with an egg receptacle, of nests having openings in their bottoms sustained above the ends of the same, chutes arranged under the nests and communicating with the ends of the receptacle, vertically movable spindles arranged to work through said chutes and the openings in said nests, caps arranged at the upper ends of said spindles for normally closing the openings in the nests and means adapted to be operated by a hen carried by the egg receptacle for effecting an upward movement of the spindles.

3. The combination with an egg receptacle, of a housing arranged over the same, nests having openings in their bottoms at the end of the housing, chutes arranged under the nests and communicating with the egg receptacle, spindles arranged at the ends of the egg receptacle and movable vertically through the chutes and openings in the nests, caps at the upper ends of said spindles for normally closing the openings in said nests, and means carried by the egg receptacle and adapted to be operated by the weight of a hen for effecting an upward movement of the spindles, substantially as described.

4. The combination with an egg receptacle, of nests having openings in their bottoms sustained above the same, chutes arranged under the nests and communicating with said receptacle, spindles movable vertically through the chutes and the openings in said nests, caps at the upper end of the spindles for normally closing the openings in the nests and means carried by the egg receptacle whereby either of the spindles may be caused to move upward independently of the other spindle when a hen is sitting on one of the nests.

5. The combination with an egg receptacle having a door, of a housing arranged longitudinally of and over the receptacle, spaced partitions arranged between the top of the egg receptacle and housing and disposed transversely of the latter to form an entrance to the housing nests proper having openings in their bottoms sustained in the housing between the ends thereof and the partitions, chutes arranged under said nests and communicating with the egg receptacle, spindles movable vertically through the chutes and nests proper, caps having outer convex surfaces at the upper ends of the spindles for normally closing the openings in the nests, nest eggs arranged on said caps and means carried by the egg receptacle adapted to be operated by the weight of a hen for causing an upward movement of said spindles.

In testimony whereof I have hereunto set my hand in presence of two subscribing witnesses.

SIDNEY H. MITCHELL.

Witnesses:
HERBERT G. DUNN,
NELLIE B. DUNN.